United States Patent
Inaba

(10) Patent No.: US 7,707,577 B2
(45) Date of Patent: Apr. 27, 2010

(54) JOB MANAGEMENT DEVICE, JOB MANAGEMENT METHOD, AND IMAGE FORMING APPARATUS INCLUDING THE JOB MANAGEMENT DEVICE AND METHOD

(75) Inventor: Michio Inaba, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1556 days.

(21) Appl. No.: 10/944,830

(22) Filed: Sep. 21, 2004

(65) Prior Publication Data

US 2005/0065894 A1 Mar. 24, 2005

(30) Foreign Application Priority Data

Sep. 22, 2003 (JP) ............................. 2003-330603

(51) Int. Cl.
- *G06F 9/46* (2006.01)
- *G06F 17/00* (2006.01)
- *G06F 3/12* (2006.01)
- *G06K 15/00* (2006.01)

(52) U.S. Cl. ...................... 718/102; 718/103; 705/402; 705/408; 358/1.15; 358/1.16

(58) Field of Classification Search .................. 705/52, 705/402, 408; 718/101, 102, 103, 104; 358/1.15, 358/1.16
See application file for complete search history.

(56) References Cited

U.S. PATENT DOCUMENTS

| | | | | |
|---|---|---|---|---|
| 5,287,194 A | * | 2/1994 | Lobiondo | 358/296 |
| 5,442,730 A | * | 8/1995 | Bigus | 706/19 |
| 5,668,993 A | * | 9/1997 | Peters et al. | 718/101 |
| 6,385,675 B1 | * | 5/2002 | Yamaguchi | 710/72 |
| 6,747,575 B2 | * | 6/2004 | Chauvin et al. | 340/932.2 |
| 7,086,057 B2 | * | 8/2006 | Hayashi | 718/102 |

(Continued)

FOREIGN PATENT DOCUMENTS

EP    1 096 399 A2    2/2000

(Continued)

OTHER PUBLICATIONS

Fifthandmission.com, Rates and Policies, Aug. 2002, (http://web.archive.org/web/20020816201932/www.fifthandmission.com/prices.htm).*

Primary Examiner—Lewis A Bullock, Jr.
Assistant Examiner—Jennifer N To
(74) Attorney, Agent, or Firm—Oliff & Berridge, PLC

(57) ABSTRACT

A job management device that determines an order in which a plurality of jobs are processed. The job management device includes a storage device that stores therein issued jobs in order and a controller. The controller selects, when the job execution rate of the job is higher than the acceptable rate of the job as a result of the comparison therebetween, a next job, calculates a job execution rate of the next job, and compares an acceptable rate of the next job with an obtained job execution rate; and performs, when the job execution rate of at least one job stored in the storage device is lower than or equal to an acceptable rate of at least one job as a result of the comparison therebetween performed on each job stored in the storage device, control so that the job whose job execution rate is lower than or equal to the acceptable rate of the job is executed.

30 Claims, 13 Drawing Sheets

U.S. PATENT DOCUMENTS

| | | | |
|---|---|---|---|
| 7,567,360 B2 * | 7/2009 | Takahashi et al. | 358/1.15 |
| 2001/0032185 A1 * | 10/2001 | Masaki | 705/52 |
| 2003/0005025 A1 * | 1/2003 | Shavit et al. | 709/102 |
| 2003/0055662 A1 * | 3/2003 | Collins | 705/1 |
| 2003/0074387 A1 * | 4/2003 | Tanaka | 709/103 |
| 2004/0015971 A1 * | 1/2004 | Spoltore et al. | 718/102 |
| 2004/0054793 A1 * | 3/2004 | Coleman | 709/229 |
| 2004/0070639 A1 * | 4/2004 | Zerza et al. | 347/19 |
| 2004/0187113 A1 * | 9/2004 | Viassolo | 718/100 |
| 2004/0215526 A1 * | 10/2004 | Luo et al. | 705/26 |
| 2004/0264501 A1 * | 12/2004 | Zalitzky et al. | 370/468 |
| 2008/0123857 A1 * | 5/2008 | Okiyama et al. | 380/277 |

FOREIGN PATENT DOCUMENTS

| | | |
|---|---|---|
| JP | A 6-324821 | 11/1994 |
| JP | A 9-128645 | 5/1997 |
| JP | A 2001-134641 | 5/2001 |
| JP | A 2001-357126 | 12/2001 |

* cited by examiner

JOB MANAGEMENT DEVICE, JOB MANAGEMENT METHOD, AND IMAGE FORMING APPARATUS INCLUDING THE JOB MANAGEMENT DEVICE AND METHOD

INCORPORATION BY REFERENCE

This application claims priority from JP 2003-330603, filed Sep. 22, 2003, the subject matter of which is incorporated herein in its entirety by reference thereto.

BACKGROUND OF THE INVENTION

1. Field of Invention

The invention relates to a job management device that can perform job management, a job management program, and an image forming apparatus including the job management device and program.

2. Description of Related Art

Conventionally, a job management device, such as a print server, puts jobs (such as print commands) which are received from terminal devices into a queue. The job management device also manages the jobs placed in the queue so that the jobs are serially executed (for example, printing operations of the jobs are serially instructed to a printer). There is provided a service that charges already-executed jobs to users of the terminal devices that have issued the executed jobs.

In the job management device that offers the above service, when several jobs, which are issued by terminal devices, are put into the queue at almost the same time, it is not reasonable to charge the issuer of the last-executed job the same amount as the issuer of the first-executed job because it takes a long time before the last job is executed. Japanese Laid-Open Patent Publication No. 9-128645 discloses reasonable job management, wherein a job management device calculates a load on the job management device. That is, when a load of a job on the job management device is light, a charge to an issuer for the job is low. When a load of a job on the job management device is heavy, a charge to an issuer for the job is high.

SUMMARY OF THE INVENTION

However, charges for jobs become higher as the load on the job management device increases for example, when the job management device is deluged with jobs. For example, when a job which does not require urgent execution is put into a queue prior to an urgent job, an issuer of the former job is charged a high cost because the load on the job management is high even though the job does not require urgent execution. The latter job cannot be executed until the former job is executed even though the job requires urgent execution. As described above, the economical aspect and urgency of the issuers are not reflected on the job management.

The invention provides a job management device that appropriately controls the order in which jobs are executed, according to urgency and estimated execution charges for the jobs, a job management program, and an image forming apparatus that includes the job management device and program.

According to one exemplary aspect of the invention, a job management device determines an order in which a plurality of jobs are processed. The job management device includes a storage device that stores therein issued jobs in order and a controller. The controller determines an amount of work required to process all the jobs stored in the storage device and calculates a processing execution rate for executing processing per unit, based on a determined amount of work; selects, in order, one of the jobs stored in the storage device; calculates a job execution rate of the job selected, based on the processing execution rate calculated and an execution requirement set to each job; compares the job execution rate calculated with an acceptable rate that is an upper limit set for the selected job in advance; selects, when the job execution rate of the job is higher than the acceptable rate of the job as a result of the comparison therebetween, a next job, calculates a job execution rate of the next job, and compares an acceptable rate of the next job with an obtained job execution rate; and performs, when the job execution rate of at least one job stored in the storage device is lower than or equal to an acceptable rate of at least one job as a result of the comparison therebetween performed on each job stored in the storage device, control so that the job whose job execution rate is lower than or equal to the acceptable rate of the job is executed.

According to another exemplary aspect of the invention, a job management device determines an order in which a plurality of jobs are processed. The job management device includes a storage device that stores therein issued jobs in order and a controller. The controller determines an amount of work required to process all the jobs including the jobs stored in the storage device and a newly-issued job, every time a new job is issued, and calculates a processing rate for executing processing per unit, based on a determined amount of work; selects, in order, one of the job stored in the job storage device every time the new job is issued; calculates a job rate of the job selected based on the processing rate calculated; compares the job rate calculated with an acceptable rate that is an upper limit set for the selected job in advance; selects, when the job rate is higher than the acceptable rate of the job as a result of the comparison therebetween, a next job, calculates a job rate of the next job, and compares an acceptable rate of the next job with the obtained job rate; and performs, when the job rate of at least one job stored in the job storage device is lower than or equal to an acceptable rate of at least one job as a result of the comparison therebetween performed on each job stored in the storage device, control so that the storage device stores a new job therein.

According to another exemplary aspect of the invention, a method of determining an order in which a plurality of jobs are executed includes the steps of storing issued jobs in order; determining an amount of work required to process all the jobs and calculating a processing execution rate for executing processing per unit, based on the obtained amount of work; selecting, in order, one of the jobs stored; calculating a job execution rate of the job selected, based on the processing execution rate calculated and an execution requirement set to each job; comparing the job execution rate calculated with an acceptable rate that is an upper limit for the selected job in advance; performing control so that a next job is selected, a job execution rate of the next job is calculated and an acceptable rate of the next job with an obtained job execution rate is compared, when the job execution rate of a selected job is higher than the acceptable rate of a job as a result of the comparison therebetween; and performing control, when the job execution rate of at least one job stored is lower than or equal to an acceptable rate of at least one job as a result of the comparison therebetween performed on each job, so that the job whose job execution rate is lower than or equal to the acceptable rate of the job, is executed.

According to another exemplary aspect of the invention, a method of determining an order in which a plurality of jobs are executed includes the steps of storing issued jobs in order; determining an amount of work required to process all the jobs, including the jobs stored and a newly-issued job, every time a new job is issued, and calculating a processing rate for executing processing per unit, based on the determined amount of work; selecting, in order, one of the jobs stored every time the new job is issued; calculating a job rate of the job selected based on the processing rate calculated; comparing the job rate calculated with an acceptable rate that is an upper limit set for the selected job in advance; performing control so that a next job is selected, a job rate of the next job is calculated and an acceptable rate of the next job is compared with the obtained job rate, when the job rate is higher than the acceptable rate of the job as a result of the comparison therebetween; and performing control so that a new job is stored therein, when the job rate of at least one job stored is lower than or equal to the acceptable rate of the job as a result of the comparison therebetween performed on each job stored.

BRIEF DESCRIPTION OF THE DRAWINGS

An embodiment of the invention will be described in detail with reference to the following figures wherein.

DETAILED DESCRIPTION OF PREFERRED EMBODIMENTS

An embodiment of the invention, in which a job management device, a job management program and an image forming apparatus including the job management device and program are embodied, will be described with reference to the accompanying drawings. In this embodiment, the description will be made while a print command is issued by a terminal device, a print server stores print commands in a queue and determines the order in which the stored print commands are executed, and a laser beam printer that includes the print server, are taken as an example of a job, the job management device, and the image forming apparatus, respectively.

Figure 1:
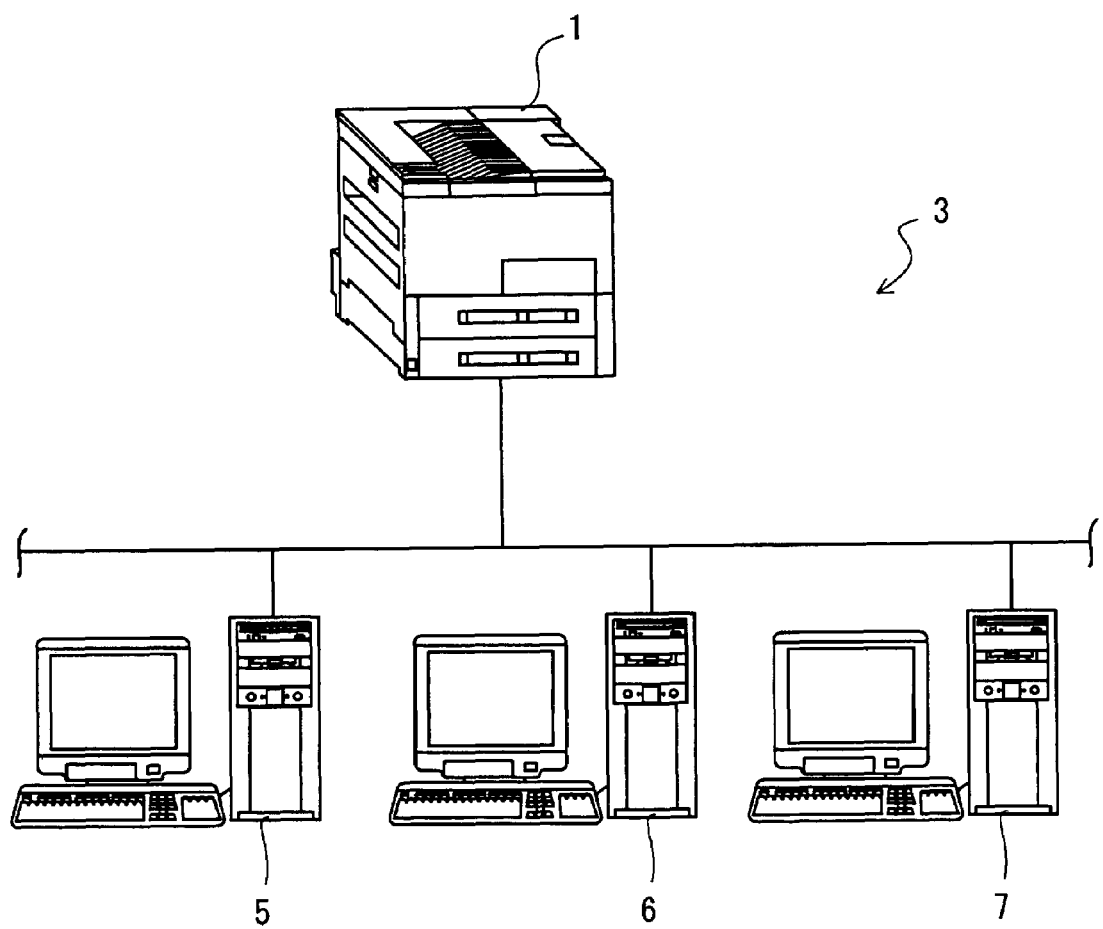
FIG. 1 is a conceptual diagram of a network in which a laser beam printer and a plurality of personal computers are connected with each other.

Referring to FIG. 1, a network environment will be described as an example of an environment where a laser beam printer 1 of the embodiment is used. As shown in FIG. 1, the laser beam printer 1 is connected with personal computers (PCs) 5, 6, 7 as a plurality of terminal devices, via a network 3. The network 3 is, for example, an in-house LAN (local area network) on which communications are performed by using protocols such as TCP/IP. The network 3 may be a closed network or a network connected to the Internet via a gateway (not shown).

Figure 2:
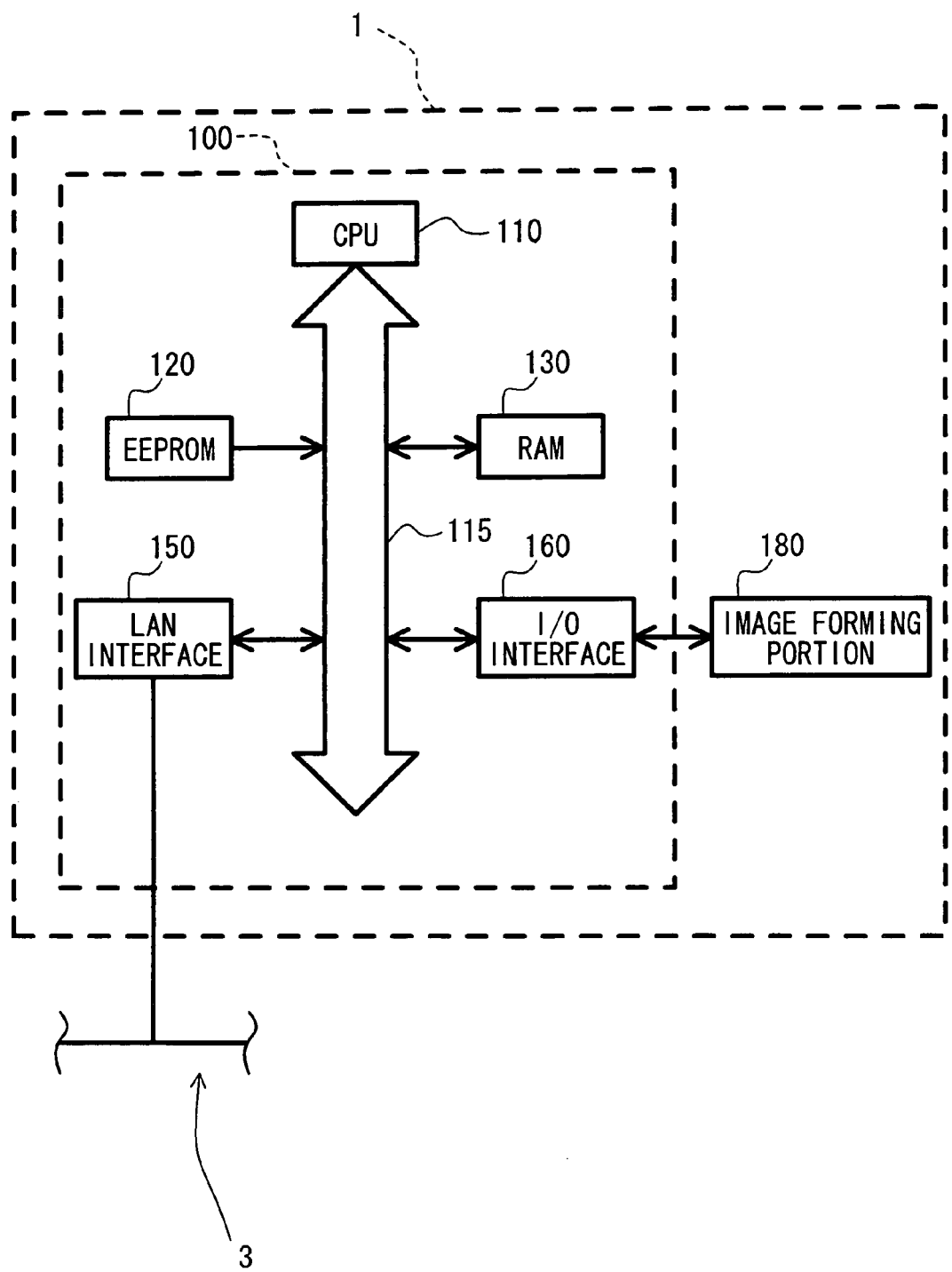
FIG. 2 is a block diagram showing an electrical configuration of the laser beam printer.
Figure 3:
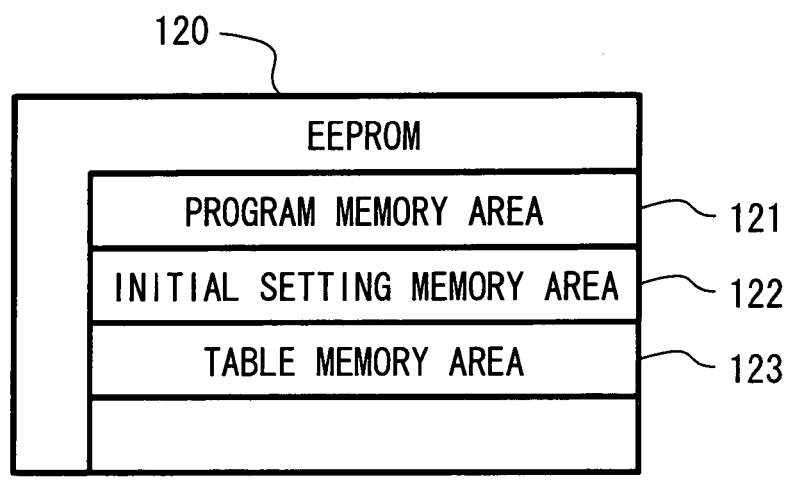
FIG. 3 is a conceptual diagram showing memory areas of an EEPROM.
Figure 4:
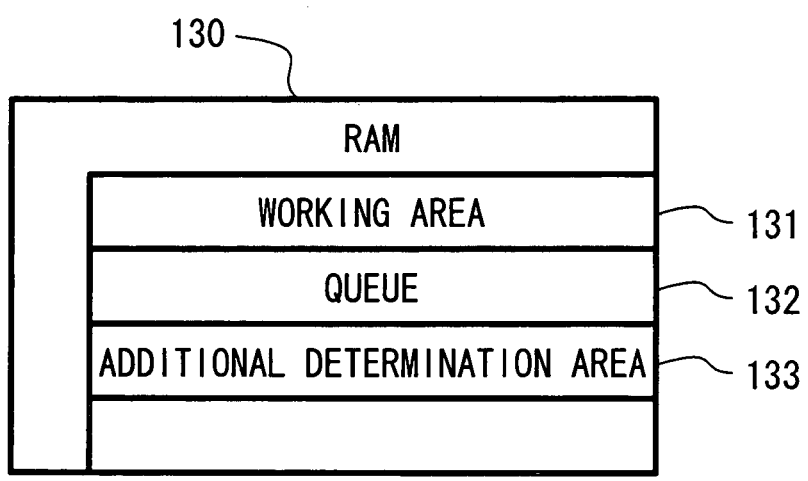
FIG. 4 is a conceptual diagram showing memory areas of a RAM.

Referring to FIGS. 2 to 4, an electrical configuration of the laser beam printer 1 will be described.

The laser beam printer 1 of FIG. 2 is a well-known electrophotographic printer equipped with a print server 100 which is connected to the network 3. The laser beam printer 1 prints an image onto a recording medium, based on inputted print data, at an image forming portion 180 controlled by a CPU (not shown). The print server 100 functions as a job management device. The image forming portion 180 functions as an image forming device.

The print server 100 temporarily stores received print commands which are issued by the PCs 5, 6, 7 via the network 3, and determines the order in which the print commands are executed. Further, the print server 100 outputs the print commands to the image forming portion 180 in the determined order and controls printing operations. The print server 100 includes a CPU 110 that controls the print server 100, a rewritable EEPROM 120 that stores various programs to be executed by the CPU 110 and initial values of various settings to be used in the above programs, a RAM 130 that temporarily stores data therein during data processing performed by the CPU 110, a LAN interface 150 that is provided in order to connect the print server 100 to the network 3, and an I/O (input and output) interface 160 that is provided in order to connect the print server 100 to the image forming portion 180, all of which are connected with each other via a bus 115.

As shown in FIG. 3, the EEPROM 120 includes various memory areas (not shown) as well as a program memory area 121, an initial setting memory area 122, and a table memory area 123. The program memory area 121 stores various programs as well as a job management program (described later) and a clock program that measures time. The initial setting memory area 122 stores various initial values to be read and set when the various programs are performed. The table memory area 123 stores various tables to be used by the job management program.

Next, the various tables stored in the table memory area 123 will be described. The table memory area 123 includes a time discount table, in which time periods and discount rates are stored corresponding to each other. Discounts are given to estimated job execution charges in accordance with time periods at which print commands are executed. The time discount table is referred to when a unit rate is calculated. For example, when a current time is referred to and thus the current time is between midnight and 9 a.m., a 3-yen discount is given to the unit rate. No discount is given to the unit rate for the time between 9 a.m. and 6 p.m. A 1-yen discount is given to the unit rate for the time between 6 p.m. and 8 p.m., and a 2-yen discount is given to the unit rate for the time between 8 p.m. and midnight. Of course, different currencies would be used for different countries. The time discount table of the embodiment functions as a time discount data storage device.

The table memory area 123 further includes a user discount table, in which registered users and discount rates are stored corresponding to each other. The registration of the users and discount rates can be performed by using an operating panel (not shown) of the laser beam printer 1 or by installing a setting application on the PCs 5, 6, 7 connected via the network 3. Referring to the user discount table, the discount rates are obtained according to user names added to print commands. For example, a 2-yen discount is set to a user A, an 1-yen discount is set to a user B, and no discount is set to a user C who has not been registered in the user discount table.

As shown in FIG. 4, the RAM 130 includes various memory areas (not shown) as well as a working area 131, a queue 132, and an additional determination area 133. The working area 131 stores various programs and also temporarily stores data during execution of the program. The queue 132 stores print commands to be performed in order of receipt. The additional determination area 133 temporarily stores the received print commands before the print commands are put into the queue 132. The queue 132 functions as a job memory device.

Figure 5:
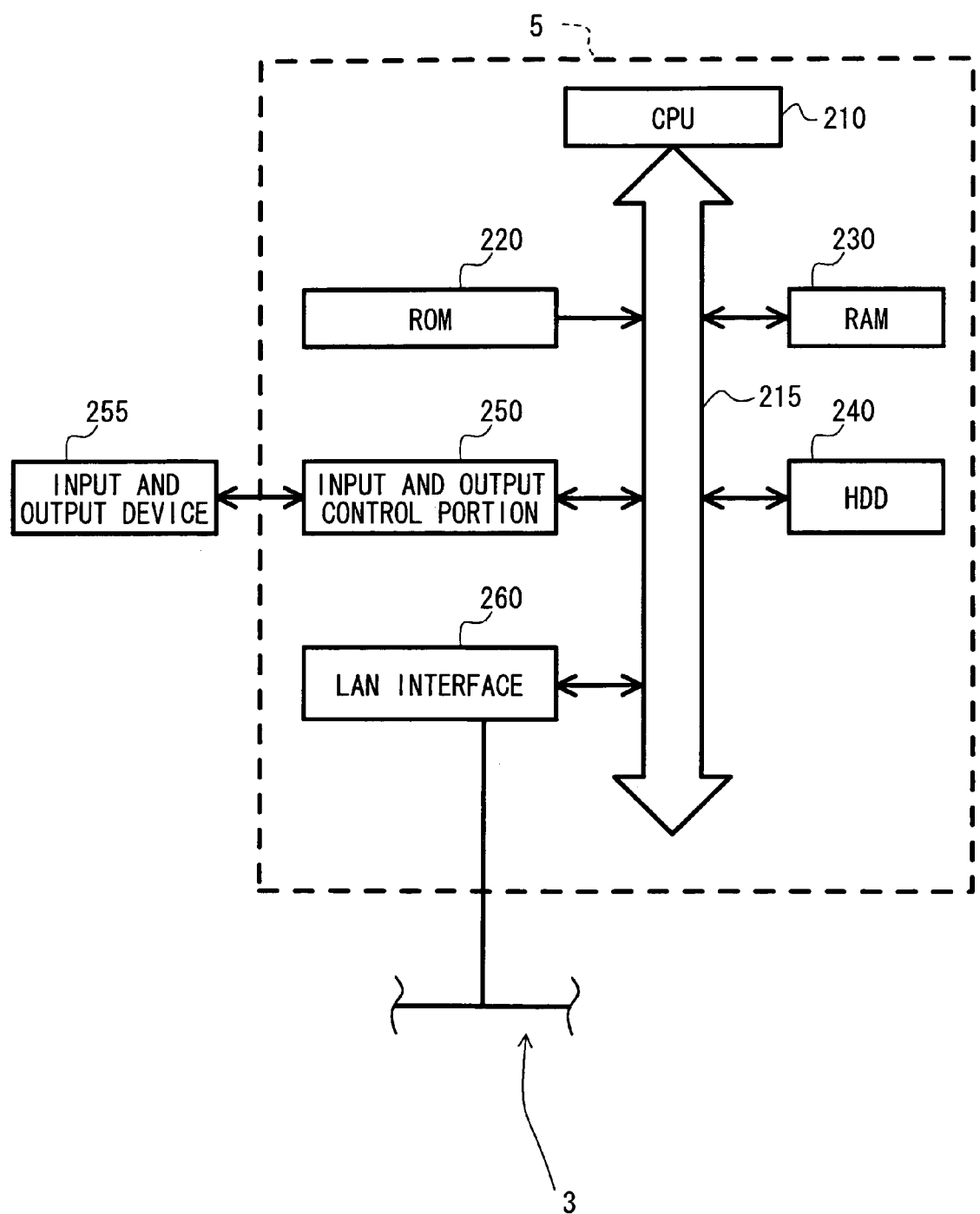
FIG. 5 is a block diagram showing an electrical configuration of one of the personal computers.

Referring to FIG. 5, an electrical configuration of the PC 5 will be described. The PCs 6, 7 have the same electrical configuration as that of the PC 5, so that explanations for the PCs 6, 7 will be omitted.

The PC 5 of FIG. 5 generates a print command for instructing the laser beam printer 1 to print an image based on a file which is created on the PC 5 by a user. The PC 5 includes a CPU 210 that controls the PC 5 itself, a ROM 220 that stores programs such as a BIOS executed by the CPU 210, a RAM 230 that temporarily stores data during data processing performed by the CPU 210, and a hard disk drive (HDD) 240 that is a data memory device, all of which are connected with each other via a bus 215.

An input and output control portion 250, which controls operations of an input and output device 255 that is used by the user to operate the PC 5, is also connected to the bus 215. The input and output device 255 may be, for example, a keyboard or a mouse that sends user's instructions to the CPU 210, a monitor or a display that informs the user of processing results by the CPU 210, or a CD-ROM drive or a magnetic disk drive that is used to install programs to be executed by the CPU 210 on the PC 5 and on which data can be read and written for performing data communications with other devices.

The PC 5 further includes a LAN interface 260 in order to connect the PC 5 to the network 3. The LAN interface 260 is also connected with the bus 215. A print command generated by the PC 5 is transmitted to the laser beam printer 1 via the network 3. A USB interface (not shown) is also connected to the bus 215.

Next, referring to FIGS. 6 to 12, operations from when a print command is generated by the PC 5, 6, 7 to when the generated print command is executed by the laser beam printer 1 will be described below.

In the laser beam printer 1 of the embodiment, print commands, which are issued by the PCs 5, 6, 7, are received and stored in the queue 132 of the RAM 130, and an estimated job execution charge for each print command is calculated in accordance with a load of each job on the laser beam printer 1. Then, an acceptable job execution charge set by the user and the calculated job execution charge are compared with each other. As a result of the comparison, the print command whose acceptable job execution charge is higher than or equal to the calculated job execution charge is executed. Basically, the print commands are executed in order of receipt. However, when the load on the laser beam printer 1 increases due to the increase of the amount of the print commands stored in the queue 132, the estimated job execution charge for performing a printing operation becomes high. Therefore, the print command whose acceptable job execution charge is higher than or equal to its estimated job execution charge is preferentially performed. That is, the print command whose acceptable job execution charge is higher than or equal to its estimated job execution charge has precedence over the print command whose acceptable job execution charge is lower than its estimated job execution charge. After the execution of the former print command is finished, the load on the laser beam printer 1 is reduced unless a print command is newly added. Then, the estimated job execution charges for the print commands remaining in the queue 132 is reduced, so that the deferred print command is then executed.

The load is calculated after a printing operation based on a print command being currently performed is completed and when a printing operation based on a next print command is performed. The load is an amount of work that is required to execute all the print commands stored in the queue 132 at that time, and is obtained based on the number of colors to be used, the total number of pages, and the number of copies to be printed of print data of each print command. Then, a unit rate, for example, as a printing charge per page, is obtained from the calculated load, and an estimated job execution charge is obtained, with respect to each print command, based on the unit rate.

Figure 6:
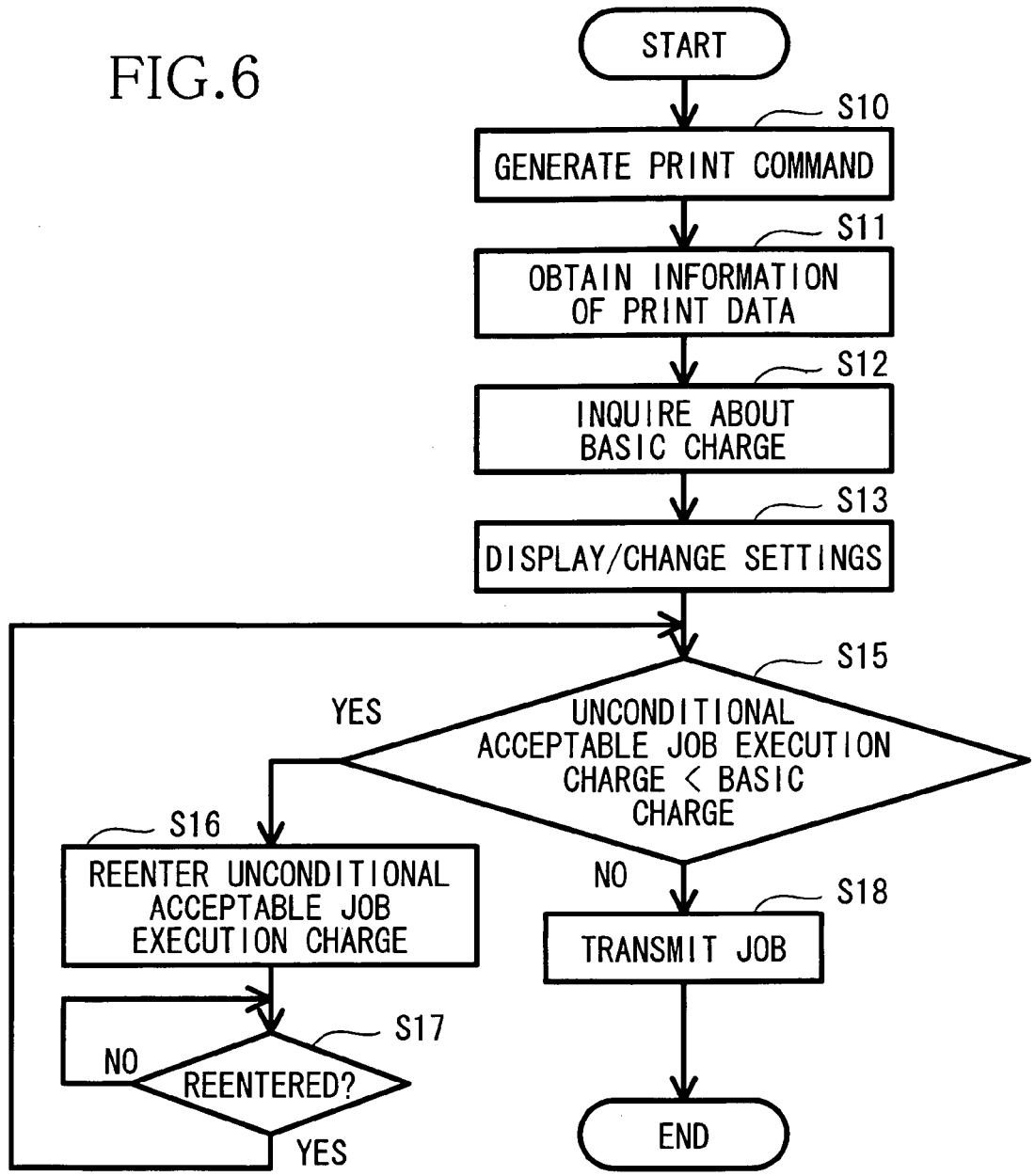
FIG. 6 is a flowchart of a process to be executed by a driver program.

A job management program to be executed in the print server 100 of the laser beam printer 1 realizes the process of changing the estimated job execution charges according to the load on the laser beam printer 1 and changing the order in which the print commands are executed. A driver program shown in FIG. 6 is preinstalled on the PCs 5, 6, 7 in order to add information (the number of colors to be used, the total number of pages, and the number of copies to be printed of the print data), which is necessary for the job management program, to the print commands. The driver program is carried out upon issue of a print command for performing a printing of an image based on a file created on an application running on the PC 5, 6, 7. The driver program is installed on the HDD 240 via the input and output device 255 or the network 3.

As shown in FIG. 6, when the driver program is carried out, first, a print command is generated based on a file to be printed (S11). This process is a well-known process that generates a print command described in a so-called page description language, for example, PostScript (registered trademark) developed by Adobe Systems Incorporated.

Then, information of the print data, such as the number of colors to be used, the total number of pages and the number of copies to be printed, is obtained from the print data which is the source of the generated print command (S11). The obtained information is provided to the laser beam printer 1 and added to the print command, and is to be used to calculate a load on the laser beam printer 1.

Next, an inquiry is made to the laser beam printer 1 about a basic charge, through the network 3 (S12). The basic charge is stored in the initial setting memory area 122 of the EEPROM 120 of the laser printer 1, and is a minimum charge per unit which is to be included in the calculation of the unit rate. The basic charge functions as a basic unit rate.

Then, other information which is set in advance by the user and is to be added to the print command is displayed on a screen of the monitor (not shown) of the PC 5, 6, 7 (S13). The other information includes a user name who issues a print command, a time limit for starting the execution of the issued print command when the print command requires urgent attention, an acceptable job execution charge that the user expects to pay when the printing operation based on the print command is started to be performed by the time limit (a conditional acceptable job execution charge), and an acceptable job execution charge that the user expects to pay without providing a time limit for starting the execution of the print command (an unconditional acceptable job execution charge). The other information can be changed by input from the input and output device 255.

Then, it is determined whether the basic charge is higher than the unconditional acceptable job execution charge (S15). When the unconditional acceptable job execution charge is higher than or equal to the basic charge (S15:NO), it is determined that the user can pay the minimum charge necessary to execute the print command, so that the print command is transmitted to the laser beam printer 1 with the above information added thereto (S18). Then, the driver program is finished.

When the unconditional acceptable job execution charge is below the basic charge (S15:YES), a request of entering a new unconditional acceptable job execution charge is made so that the reentered unconditional acceptable job execution charge is higher than or equal to the basic charge (S16). When a new unconditional acceptable job execution charge is entered (S17:YES), flow goes back to S15. Otherwise flow waits until a new unconditional acceptable job execution charge is entered (S17:NO).

Thus, the print command, which is issued by the PC 5, 6, 7 as described above, is received by the print server 100 of the laser beam printer 1 via the network 3. As described above, in the print server 100 an estimated job execution charge for the received print command is calculated. The calculation is achieved by the job management program. When the laser beam printer 1 receives the print command, the job management program performs a determination whether the received print command is put into the queue 132.

Figure 11:
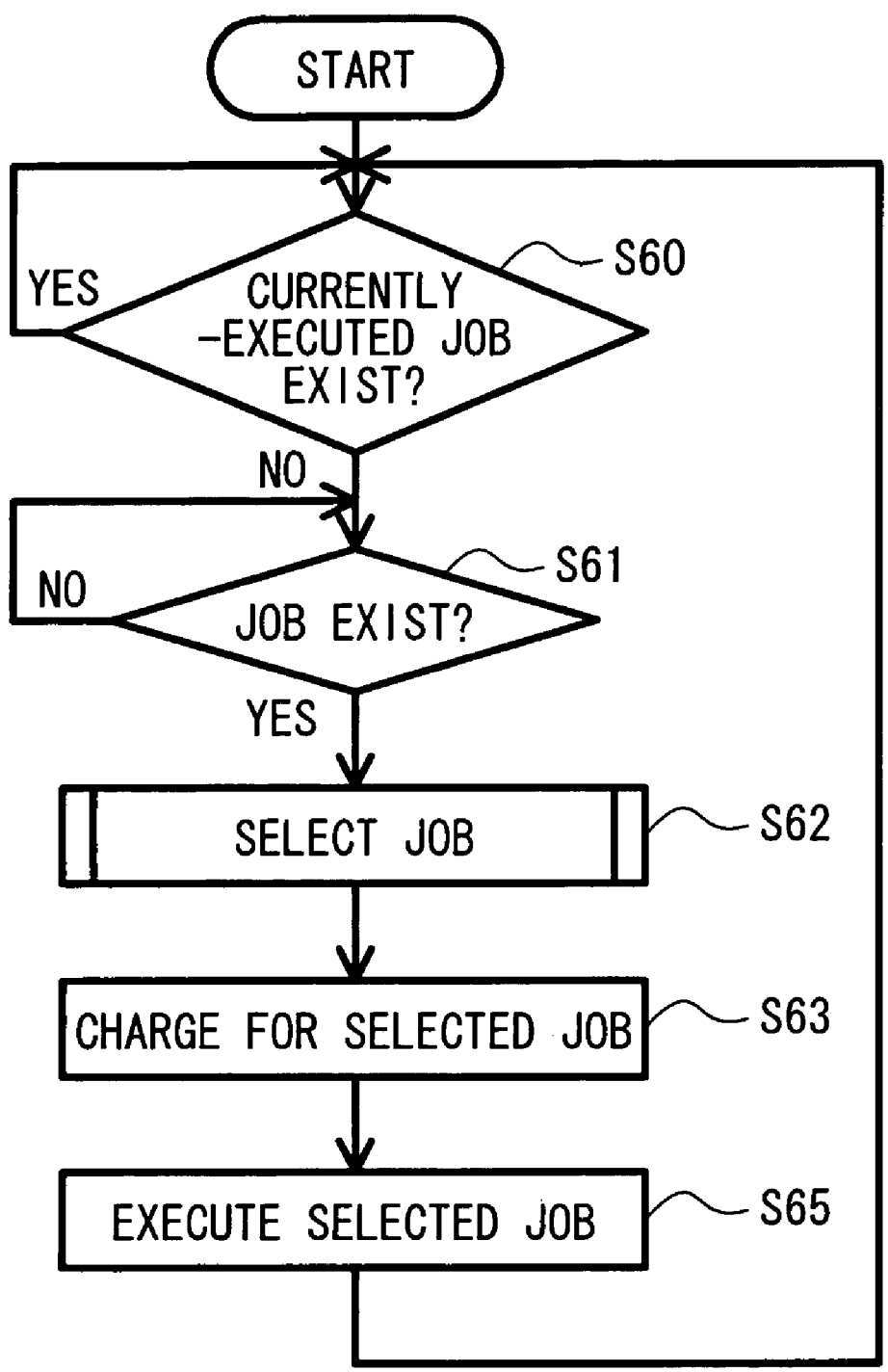
FIG. 11 is a flowchart of a job management program for job execution.

When the power of the laser beam printer 1 is turned on, an execution portion of the job management program is read into the working area 131 of the RAM 130 from the program memory area 121 of the EEPROM 120. At that time, a management program executed for job receipt shown in FIG. 7 and a job management program for job execution shown in FIG. 11 are concurrently performed.

When a print command is newly added to the queue 132, the load on the laser beam printer 1 increases and thus the estimated job execution charges for the print commands already stored in the queue 132 increase. As a result, all the estimated job execution charges for the print commands stored in the queue 132 may become higher than the respective set acceptable job execution charges. Then, in order to avoid occurring such a condition where all the print commands stored in the queue 132 cannot be printed for lack of money, the job management program for receipt of a job is executed.

Figure 7:
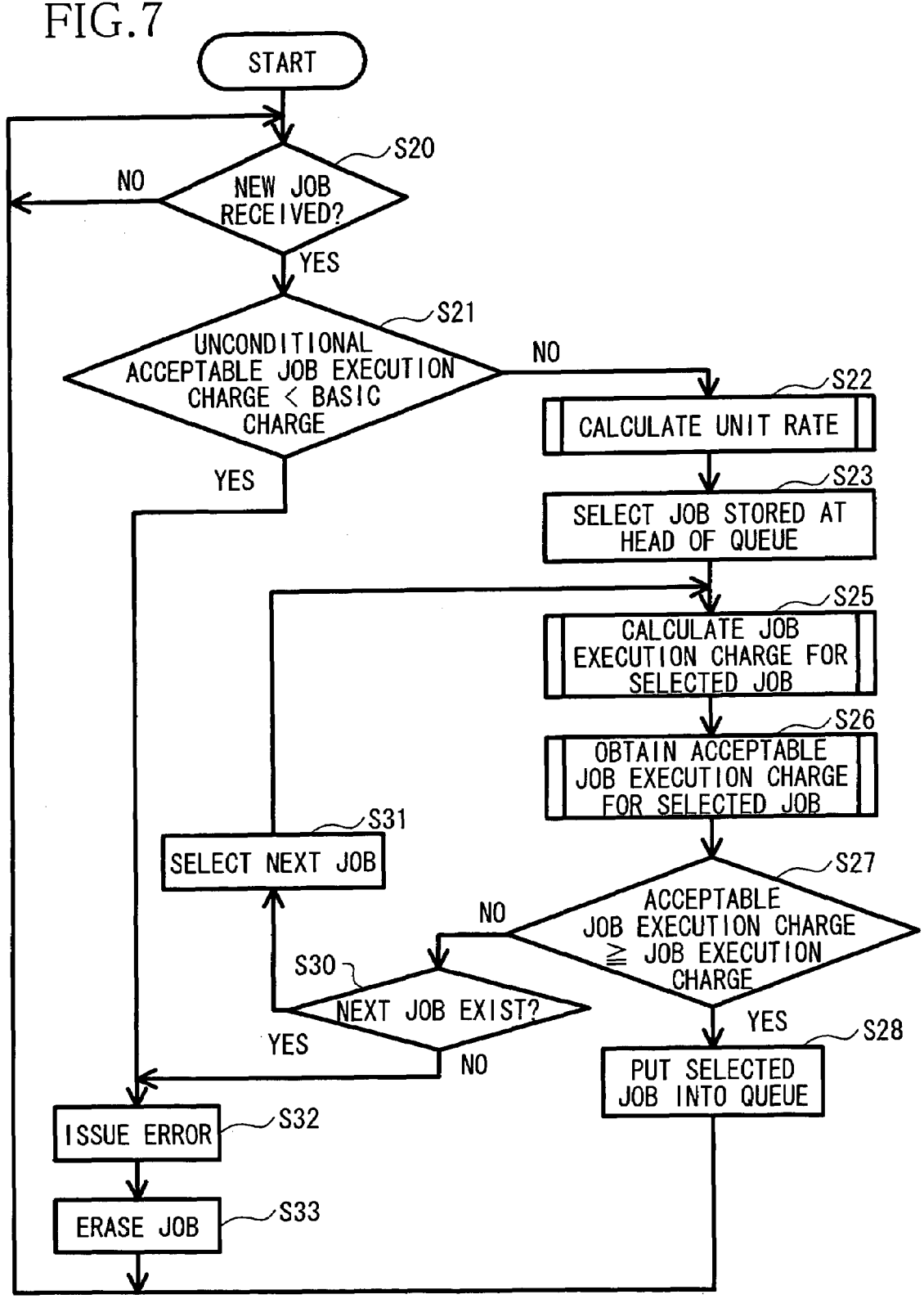
FIG. 7 is a flowchart of a job management program for job receipt.

As shown in FIG. 7, when the job management program for job receipt starts, flow waits until the laser beam printer 1 receives a print command as a new job from one of the PCs 5, 6, 7 (S20:NO). When the laser beam printer 1 receives a new print command (S20:YES), the new print command is stored in the additional determination area 133. Then, based on the information added to the stored new print command, an unconditional acceptable job execution charge and a basic charge of the new print command are compared with each other (S21). This process is the same as the process performed at S15 of the driver program. When the unconditional acceptable job execution charge is lower than the basic charge stored in the initial setting memory area 122 (S21:YES), it is determined that the user cannot pay the minimum charge necessary to execute the print command, so that an error is issued to the PC 5, 6, 7 that has been issued the print command (S32). Then, the print command is erased (S33), that is, the contents of the additional determination area 133 are erased. After that, flow goes back to S20 and waits until the laser beam printer 1 receives a next new print command. The CPU 110 that erases the print command at S33, functions as a new job erasing device. The CPU 110 that informs the issuer of the print command about an error, functions as an error informing device.

Figure 8:
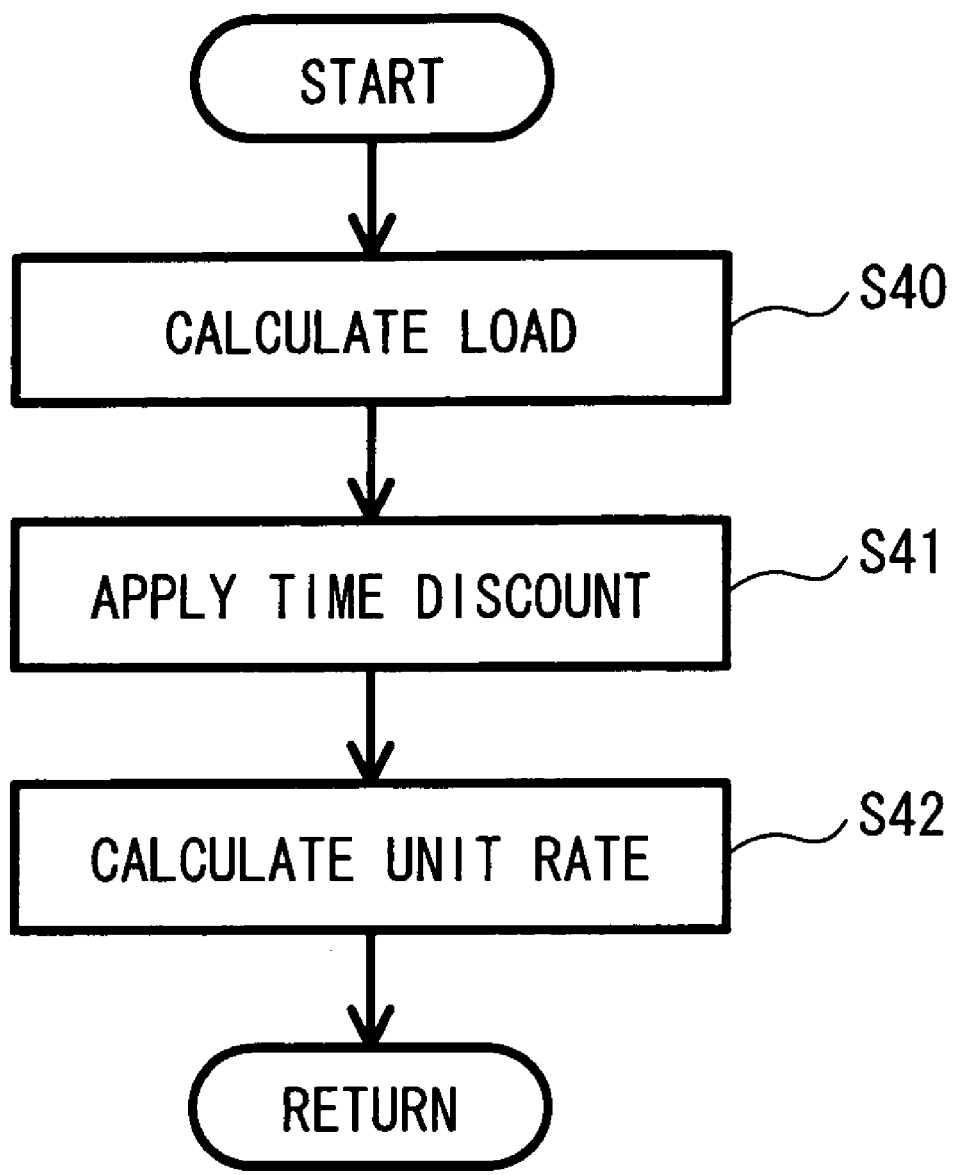
FIG. 8 is a flowchart of a unit rate calculating subroutine to be called up.

As a result of the above comparison at S21, when the unconditional acceptable job execution charge is higher than or equal to the basic charge (S21:NO), a unit rate is then calculated (S22). At this processing, a subroutine shown in FIG. 8 is called up. The CPU 110 that calls the subroutine for calculating the unit rate, as a processing unit rate, functions as an execution rate calculating device.

As shown in FIG. 8, in the unit rate calculating subroutine, first, a load on the laser beam printer 1 is calculated (S40). At this processing, a load of all the print commands, which include the new print command stored in the additional determination area 133 and the print commands stored in the queue 132, on the laser beam printer 1, that is, the amount of work that is required to execute all the print commands, is obtained. On a command-by-command basis, the number of colors to be used, the total number of pages, and the number of copies to be printed of the print data are obtained from the information added to the print command, and those obtained values are multiplied. Then, the multiplied results of the print commands are summed to obtain the load on the laser beam printer 1.

Next, a time discount is applied (S41). In the print server 100, the clock program stored in the program memory area 121 of the EEPROM 120 runs concurrently with the job management program. A backup power source (not shown) is connected to the print server 100, so that the clock program continuously runs to measure the time at all times even when the power of the laser beam printer 1 is turned off. The clock program provides a current time in response to an inquiry made from the other programs, such as the job management program. At S41, a current time is inquired to the clock program and then the time discount table stored is referred to in the table memory area 123. Then, a discount rate of the time period to which the current time belongs is stored in the working area 131. The CPU 110 that runs the clock program stored in the program memory area 121 at S41, functions as a clock device. The CPU 110 that obtains the current time from the clock program, functions as a time obtaining device.

Then, a unit rate is obtained (S42). A unit rate, which is a printing charge per page, is obtained by a following equation.

Unit rate=Basic charge+{Standard charge×(Current load/Standard load)}−Time discount rate The basic charge is a minimum charge per unit, as described above. The standard charge is a predetermined charge and is added to the basic charge after multiplied by a scale factor according to the variations of the load. The current load is a load obtained at S40. The standard load is a predetermined reference load that is a tolerable amount of load for the laser beam printer 1 when performing the processing. The time discount rate is a discount obtained based on the time discount table at S41. After the unit rate is obtained, flow returns to the main routine of the job management program for job receipt. The CPU 110 that applies the time discount obtained with reference to the time discount table to the calculation of the unit rate at S42, functions as a time discount setting device.

Figure 9:
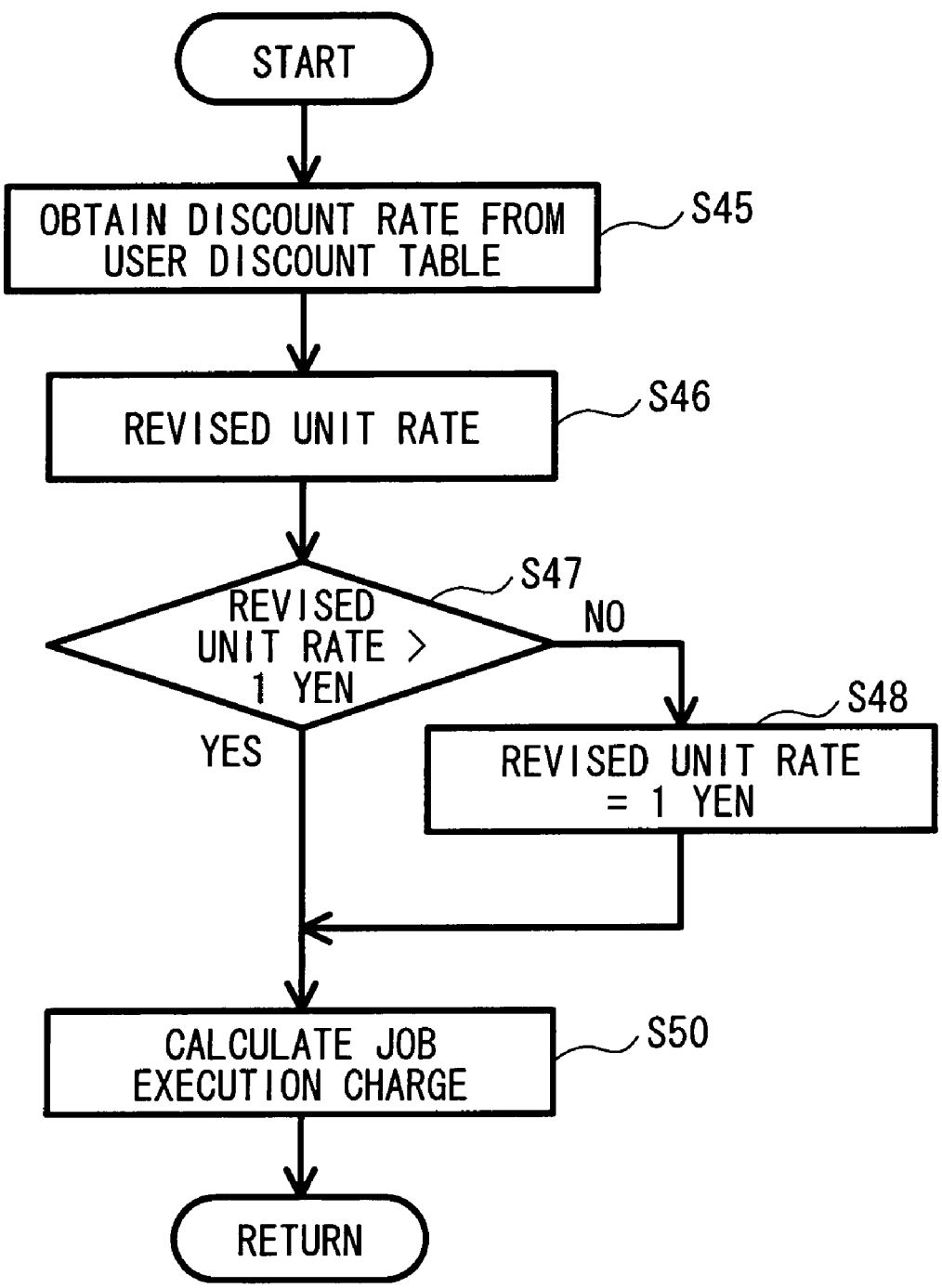
FIG. 9 is a flowchart of a job execution charge calculating subroutine to be called up.

When flow goes back to the main routine of FIG. 7, the print command stored at the head of the queue 132 in the storage order is selected as a target of the calculation at S25 and the following steps (S23). Then, an estimated job execution charge for the selected target print command is calculated (S25). At this processing, a subroutine of FIG. 9 is called up. The CPU 110 that selects the target print command at S23, functions as a job selecting device. The CPU 110 that calls up the subroutine for calculating an estimated job execution charge as a job rate at S25, functions as a job rate calculating device.

As shown in FIG. 9, in the estimated job execution charge calculating subroutine, a discount rate is obtained based on the user's name which is added to the target print command, with reference to the user discount table (S45), and is stored in the working area 131. Then, the unit rate is revised according to the target print command (S46). As described later, basically, the print commands are stored in the queue 132 in the order in which the print server 100 receives the print commands, and the print commands are executed in this order. However, there is a case where a late-received print command is executed prior to a previously-received print command when the load on the laser beam printer 1 becomes heavy. Accordingly, a count value referred to as a deferment count is provided to each print command. When the execution order of a print command is deferred, its count value of the decrement count is incremented. An initial value of the deferment count is zero (0). At S46, the unit rate to which the discount rate according to the count value of the deferment count and the discount rate according to the user are applied is set as a revised unit rate. The revised unit rate is obtained by the following equation.

Revised unit rate=Unit rate−Deferment count×Deferment discount rate−User discount rate The deferment discount rate is determined in advance, and is multiplied by the value of the deferment count. The deferment discount rate is set such that the discount rate increases as the number of deferment times increases. The CPU 110 that sets the user discount rate based on the user's name added to the target print command, with reference to the user discount table at S45, functions as a preferential discount setting device. The CPU 110 that gives a discount on the unit rate based on the deferment count, functions as a deferment discount setting device.

When the obtained revised unit rate is lower than 1 yen (S47:NO), the revised unit rate is set to 1 yen (S48) and an estimated job execution charge is then calculated using 1 yen of the revised unit rate. When the revised unit rate is 1 yen or higher (S47:YES), an estimated job execution charge is then calculated using the calculation result (S50) of course, different currencies would be used for different countries. The estimated job execution charge is obtained by the following equation.

Job execution charge=Revised unit rate×Total number of pages×Number of copies to be printed The total number of pages and the number of copies to be printed are obtained from the information added to the target print command, and are multiplied by the revised unit rate. The obtained job execution charge for the target print command is stored in the working area 131, and then, flow goes back to the main routine of the job management program for job receipt.

When flow goes back to the main routine of FIG. 7, the acceptable job execution charge is obtained from the information added to the target print command (S26). As described above, a conditional acceptable job execution charge and an unconditional acceptable job execution charge are set to each print command. At this processing, a subroutine of FIG. 10 is called up and one of the acceptable job execution charges is selected based on the current time.

Figure 10:
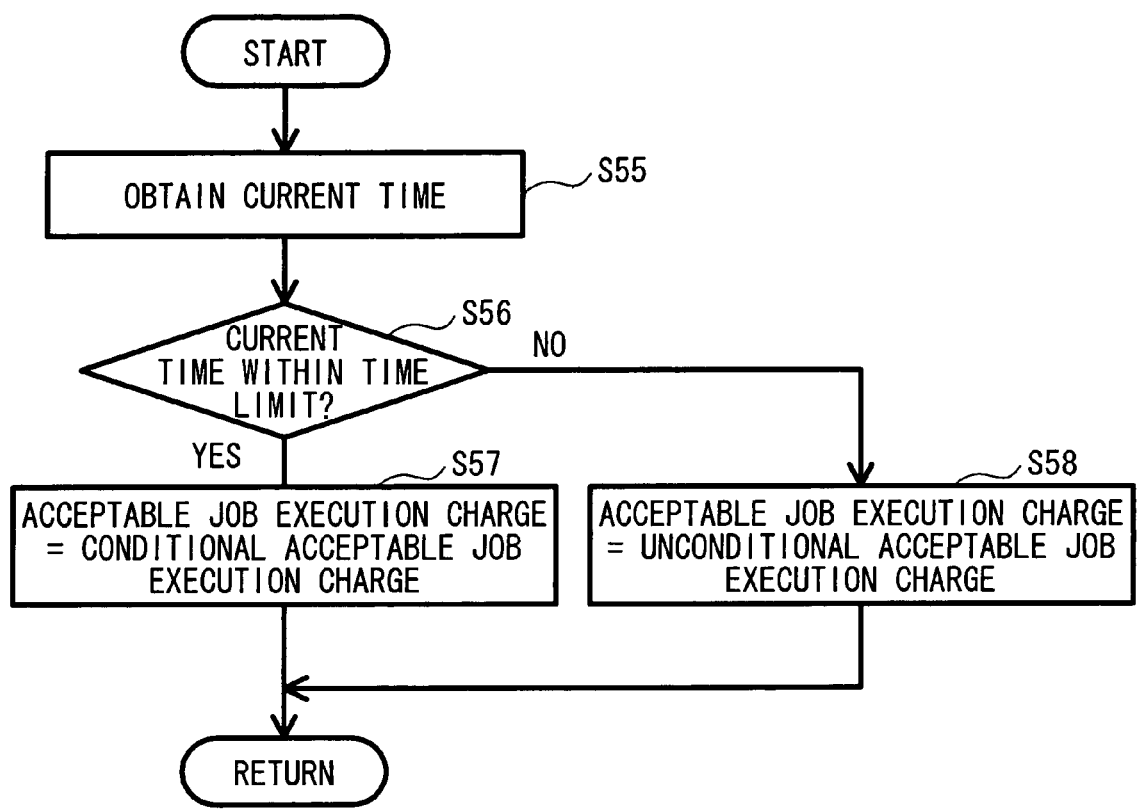
FIG. 10 is a flowchart of an acceptable job execution charge setting subroutine to be called up.

As shown in FIG. 10, in the acceptable job execution charge setting subroutine, a current time is obtained by which an inquiry is made to the clock program (S55). Then, the obtained current time is compared with the time limit set to the conditional acceptable job execution charge of the target print command (S56). When the current time has not reached the time limit (S56:YES), the conditional acceptable job execution charge is set as an acceptable job execution charge because the current time is within the set time limit (S57). When the current time has reached or passed the set time limit (S56:NO), the unconditional acceptable job execution charge is set as an acceptable job execution charge (S58). After that, flow goes back to the main routine of the job management program for job receipt. The CPU 110 that compares the limit time and the current time at S56, functions as a time comparing device. The CPU 110 that sets the acceptable job execution charge based on the comparison result at S57 or S58, functions as an acceptable rate selecting device.

When flow goes back to the main routine of FIG. 7, it is determined whether the acceptable job execution charge for the target print command set at S26 is higher than or equal to the estimated job execution charge for the target print command obtained at S25 (S27). When the acceptable job execution charge is lower than the estimated job execution charge (S27:NO), the target print command cannot be executed for lack of money. Therefore, the storage of the queue 132 is checked in the job storage order whether there is a print command to be targeted for the next comparison (S30). When there is a print command whose acceptable job execution charge and estimated job execution charge has not been compared with each other yet in the queue 132 (S30:YES), the print command is selected as a target print command (S31) and flow goes back to S25. When the comparison has already been performed on all the print commands that are stored in the queue 132, the new print command stored in the additional determination area 133 is selected as a target print command. The CPU 110 that compares the acceptable job execution charge and the estimated job execution charge at S27, functions as a job rate comparing device. The CPU 110 that performs control so that flow moves to S31 from S30 to select the next print command and then flow moves to S25, S26 and S27, functions as a next job selection controlling device.

When the comparison between the acceptable job execution charge and the estimated job execution charge have been completed with respect to all the print commands stored in both the queue 132 and the additional determination area 133 (S30:NO), the acceptable job execution charges set to the print commands stored in the queue 132 and the new print command stored in the additional determination area 133 are not enough to perform their execution. That is, when the load on the laser beam printer 1 increases because of the addition of a new print command into the queue 132, the estimated job execution charges for the print commands increase, and thus, the lack of money happens on all the print commands stored in the queue 132 and the additional determination area 133 and all the print commands cannot be executed. Therefore, an error is informed to the PCs 5, 6, 7 which have issued the print commands, to the effect that the laser beam printer 1 cannot receive the issued print commands (S32) and the new print command is erased from the additional determination area (S33). Then, flow goes back to S20 and waits for receiving a next print command.

At S27, when there is at least a print command whose acceptable job execution charge is higher than or equal to its estimated job execution charge in the additional determination area 133 (S27:YES), the print command is put into the queue 132 at the tail end in the storage order (S28) and thus the printer 1 accepts the new print command. Then, flow goes back to S20 and waits for receiving a next print command. The CPU 110 that stores the new print command in the queue 132 at S28, functions as a new job storage controlling device.

The print command put into the queue 132 as described above is then outputted to the image forming portion 180 (see FIG. 2), according to the job management program for the job execution shown in FIG. 1. As shown in FIG. 1, first, when a preceding print command is still being executed by the image forming portion 180 (S60:YES), flow waits until the execution of the preceding print command is completed. When the printing operation based on the preceding print command is finished and the image forming portion 180 is turned in a state where to be able to perform a printing operation base on a next print command (S60:NO), it is determined whether there is a print command stored in the queue 132 (S61). When there is no print command stored in the queue 132 (S61:NO), flow waits under this condition until a new print command is put into the queue 132.

When there are print commands stored in the queue 132 (S61:YES), it is determined which print command should be outputted to the image forming portion 180 (S62). At this processing, a subroutine of FIG. 12 is called up.

Figure 12:
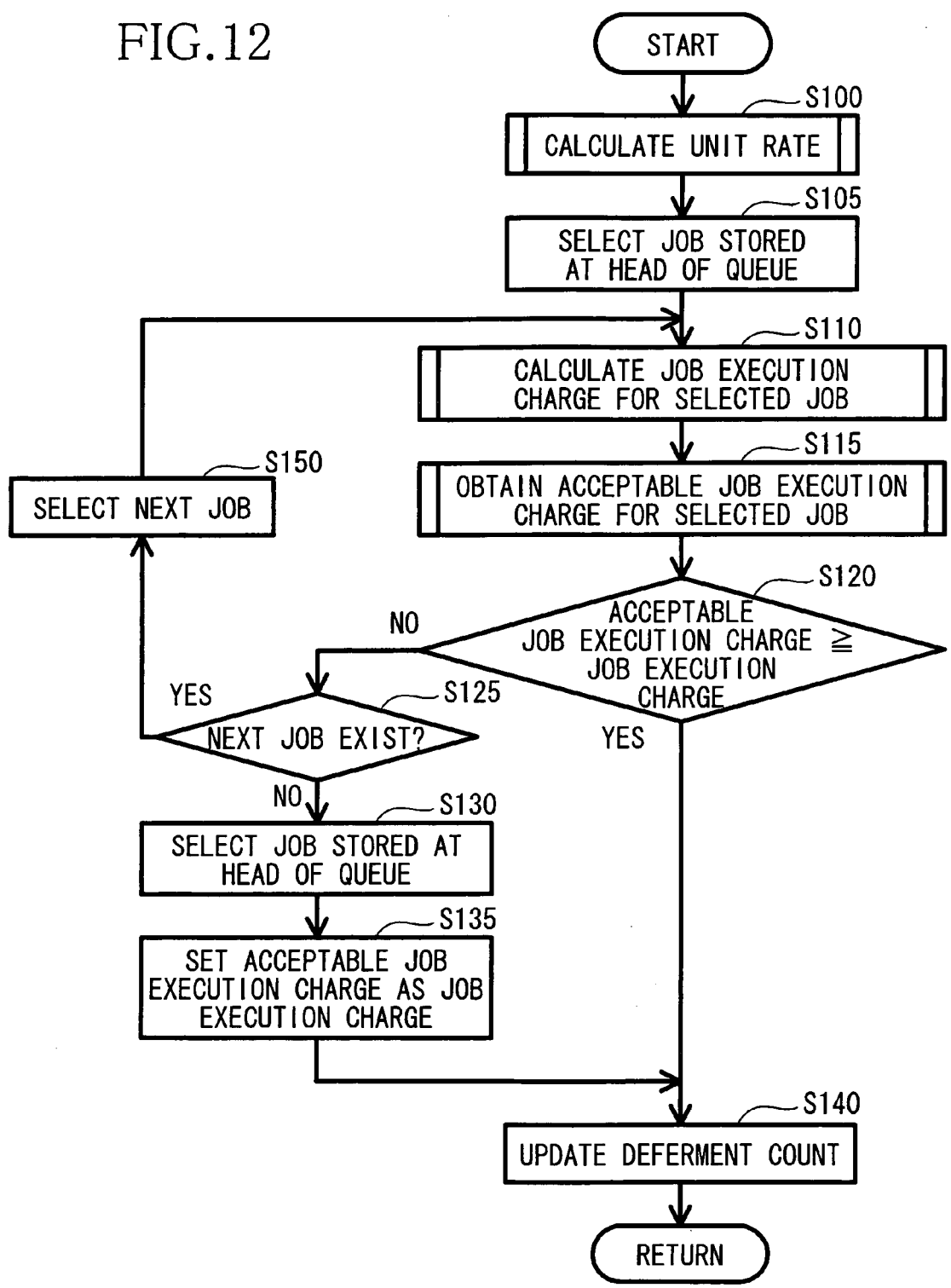
FIG. 12 is a flowchart of a print command selecting subroutine to be called up.

As shown in FIG. 12, in the print command selecting subroutine, first, a unit rate is calculated (S100). As described above, the subroutine of FIG. 8 is called up in order to calculate a load on the laser beam printer 1, and a unit rate is determined based on the result. Then, flow goes back to the subroutine of FIG. 12. The CPU 110 that calls the subroutine for calculating a unit rate as a processing execution rate at S100, functions as a processing execution rate calculating device.

Next, as described above, the print command stored at the head of the queue 132 in the storage order is selected as a target print command (S105). Then, a subroutine of FIG. 9 is called up in order to calculate an estimated job execution charge for the target print command (S110). After that, flow goes back to the subroutine of FIG. 12, and the subroutine of FIG. 10 is called up in order to set an acceptable job execution charge based on the current time (S115). The CPU 110 that selects a target print command at S105, functions as an execution job selecting device. The CPU 110 that calls the subroutine for calculating an estimated job execution charge as a job execution rate at S110, functions as a job execution rate calculating device.

When flow goes back to FIG. 12, the acceptable job execution charge set at S115 and the estimated job execution charge obtained at 110 are compared with each other (S120). When the acceptable job execution charge is lower than the estimated job execution charge (S120:NO), the storage of the queue 132 is checked in the storage order whether there is a next target print command (S125). When there is a print commands on which the comparison between the acceptable job execution charge and the estimated job execution charge has not been performed yet (S125:YES), the print command is selected as a next target print command (S150) and flow goes back to S110. The CPU 110 that compares the acceptable job execution charge with the estimated job execution charge at S120, functions as job execution rate comparing device. The CPU 110 that performs control so that flow moves to S150 from S125 in order to select the next print command and then flow moves to S110, S115, and S120, functions as a next execution job selection controlling device.

At S120, when there is at least print command whose acceptable job execution charge is higher than or equal to the estimated job execution charge (S1120:YES), the print command is selected as a target print command. In a state where the print command is selected as a target print command, the deferment counts of the print commands are updated (S140). Then, flow goes back to the main routine of FIG. 11. However, when there is no print command whose acceptable job execution charge is higher than or equal to the estimated job execution charge after the comparison is performed on all the print commands stored in the queue 132 (S120:N0, S125: NO), the print command stored at the head of the queue 132 in the storage order is selected again (S130), and then, the acceptable job execution charge for the selected print command is set as the estimated execution charge (S135). Further, the deferment counts of the print commands, which are stored in the queue prior to the selected print command, are updated (S140) and flow goes back to the main routine of FIG. 11. That is, even when the estimated job execution charges for the print commands stored in the queue 132 become higher than their acceptable job execution charges because of the increased load on the laser beam printer 1, an adjustment is made so that all the print commands are to be executed. The CPU 110 that controls such that the print command whose acceptable job execution charge is determined to be higher than or equal to the estimated execution charge at S120 is executed at S65, functions as a job execution controlling device.

The update of the deferment count is performed on any print command, which is stored in the queue 132 at the position prior to the selected print command. Each of the count value of the print command is incremented by one (1). Thus, a discount is applied to the revised unit rate calculated at S46 of FIG. 9, based on the deferment count. Accordingly, a requirement is more likely to be satisfied in the comparison between the acceptable job execution charge and the estimated job execution charge.

When flow goes back to the main routine of FIG. 11, a charge is made in order to execute the currently-selected print command (S63). At this processing, the estimated job execution charge is made to the user of the PC 5, 6, 7 based on the information of the user's name added to the selected print command. For charging, various methods are conceivable. For example, a charging server is provided so that the job execution charge is withdrawn by which the user enters a user ID and a password. Another example is that a memory area is provided in the RAM 130 in order to store a user's name and job execution charges for executed print commands. In this system, a charge is added to a sum total of the charges every time the charge is made on the print command and the sum total of the charges are collected later.

After the estimated job execution charge for the selected print command is charged, the print command is executed (S65). That is, the selected print command is outputted to the image forming portion 180 and a printing operation is performed based on the selected print command. After the selected print command is outputted, flow goes back to S60. During the execution of the selected print command, flow waits so that processing is not performed on other print commands stored in the queue 132.

As described above, in the laser beam printer 1 of the embodiment, the load on the laser beam printer 1 is calculated based on the print commands stored in the queue 132 and the job execution charges for executing the print commands vary depending on the calculation results of the unit rate obtained based on the load. The acceptable job execution charge is set to each print command, and the print commands that can be executed within the set acceptable job execution charges are selected and executed. When the estimated job execution charge increases because of the increased load on the laser beam printer 1, the print command whose acceptable job execution charge is set to be higher and or equal to the estimated job execution charge is preferentially executed.

The discounts are applied to the estimated job execution charge, based on the user and deferment count, so that the estimated job execution charge for the target print command is easier to lower than the set acceptable job execution charge. Therefore, the target print command is likely to be preferentially executed prior to the other print commands. The estimated job execution charge is changed depending on the load on the laser beam printer 1, so that the print command can be executed at a low cost when the load on the laser beam printer 1 is light. Therefore, the user's expense can be reduced. In addition, because the time discount, which applies according to the time periods, is provided, the user who desires to get a discount can be led to perform a printing operation within the time period at which a discount rate is high. Thus, the load on the laser beam printer 1 can be distributed.

Figure 13:
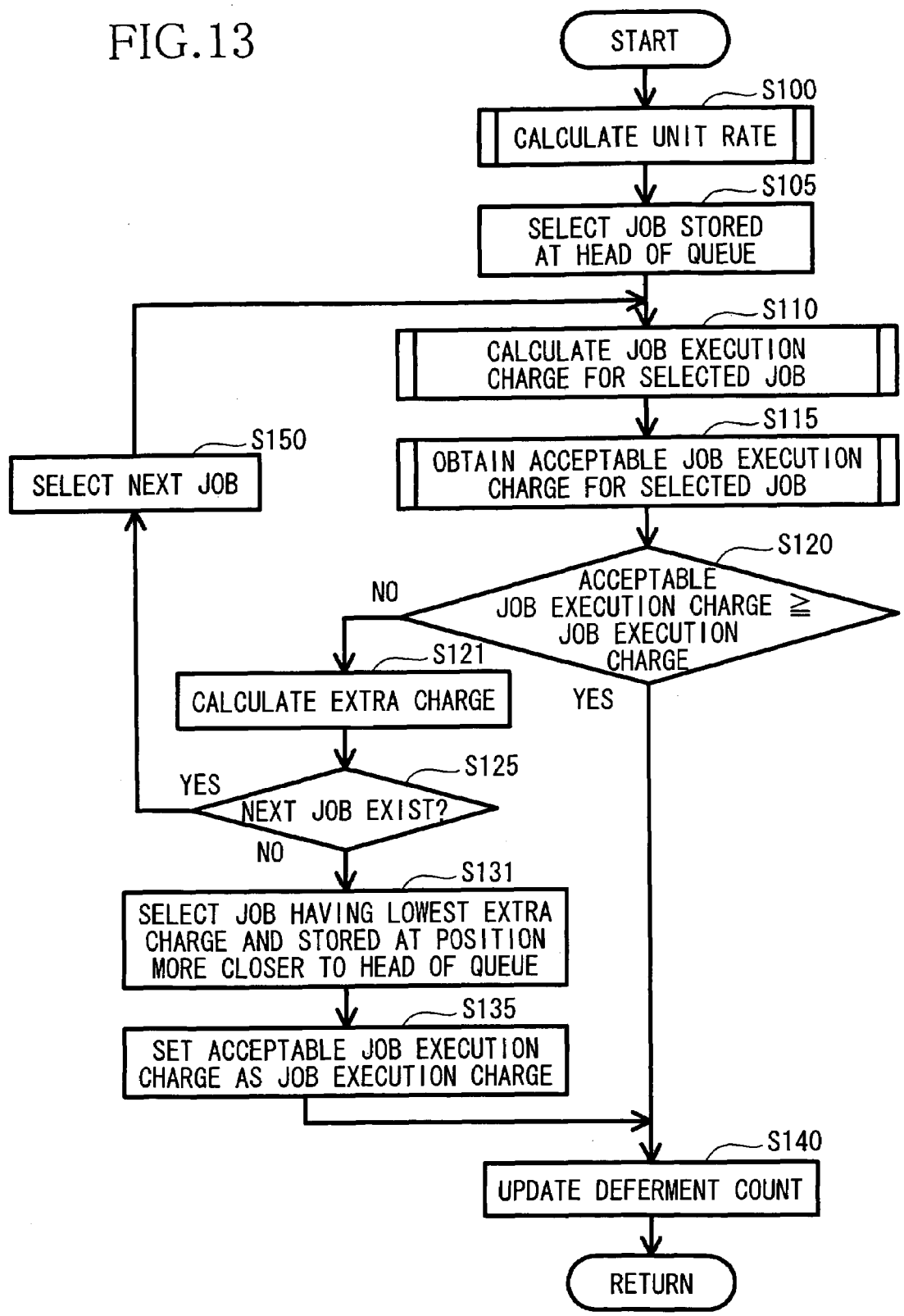
FIG. 13 is a variation of the print command selecting subroutine.

While the invention has been described in detail with reference to the specific embodiment thereof, it would be apparent to those skilled in the art that various changes, arrangements and modifications may be applied therein without departing from the spirit and scope of the invention. For example, as shown in FIG. 13, an extra charge may be calculated and a target print command is selected based the result. FIG. 13 shows a variation of the print command selecting subroutine of FIG. 12. The contents of S100 to S120, S125, S135 to S150 are the same as those of S100 to S120, S125, S135 to S150 of the above-described embodiment. When an acceptable job execution charge is lower than an estimated job execution charge of the print command selected at S105 (S120:NO), the acceptable job execution charge is subtracted from the estimated execution charge and the obtained value is stored in a predetermined storage area in the RAM 130, as an extra charge, in correspondence with the selected print command (S121). When there is no print command whose acceptable job execution charge is higher than or equal to the estimated job execution charge after their comparison is performed on all the print commands stored in the queue 132 (S120:N0, S125:NO), the obtained extra charges for all the print commands stored in the queue 132 are compared with each other and the print command having the lowest extra charge is selected (S131). It may be designed such that, when there are several print commands which have the lowest extra charge, the print command that has been put in the queue 132 fast in the several print commands, i.e., the print command that is stored at the position more closer to the head of the queue 132, is performed first. By doing so, of the print commands to which discounts are applied, the print command, which provides the charge (the acceptable job execution charge) that is the nearest to the estimated job execution charge, is to be executed prior to the other print commands.

Figure 14:
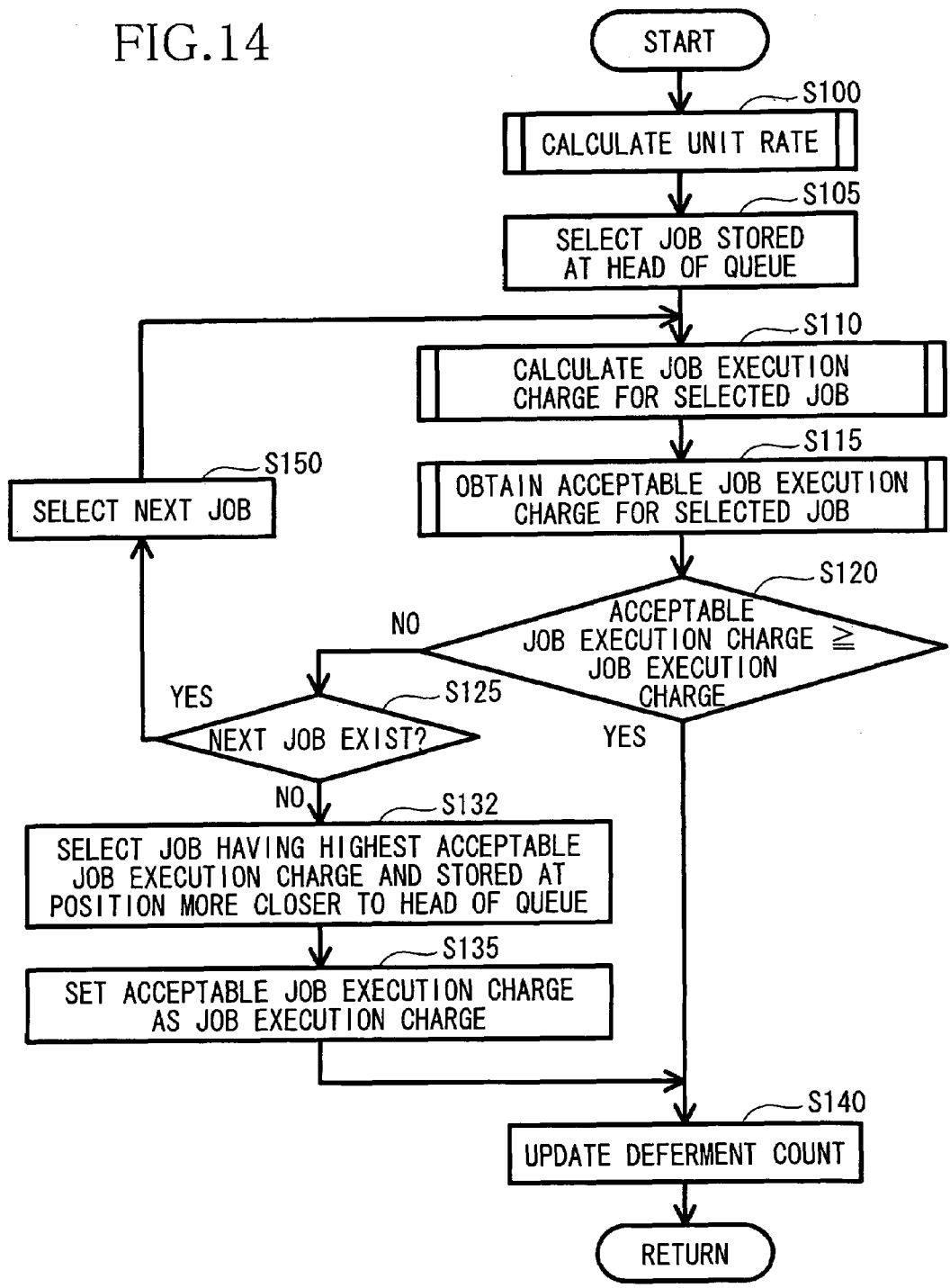
FIG. 14 is another variation of the print command selecting subroutine.

At S130 shown in FIG. 12, when the estimated job execution charges for all the print commands are over their respective acceptable job execution charges and thus all the print commands stored in the queue 132 cannot be executed, the print command, which is stored at the head of the queue 132 in the storage order, is selected. It may be designed such that, as shown in FIG. 14, at S132, the acceptable job execution charges of all the print commands stored in the queue 132 are compared with each other and then the print command having the highest acceptable job execution charge is selected. It may be designed such that, when there are several print commands which have the highest acceptable job execution charge, the print command that has been put in the queue 132 fast in the several print commands, i.e., the print command that is stored at the position more closer to the head of the queue 132, is performed first. In FIG. 14, the contents of S100 to S125 and S135 to S150 are the same as the contents of S100 to S125 and S135 to S150 of the above-described embodiment.

In the embodiment, the job management program is executed in the print server 100 equipped in the laser beam printer 1 in order to perform the job management. However, a server connecting the network 3 may be provided separately from the laser beam printer 1, and the job management program may be installed thereon. Then, the job management may be performed on a printer locally connected to the server or connected to the server through the network 3.

The image forming apparatus is not limited to the laser beam printer. The image forming apparatus may be an ink jet printer, a copying machine or a multifunctional machine equipped with the image forming device. Further, when a multifunctional machine having a facsimile function is used, facsimile data, which is received from a terminal device as a communication target connected thereto by a network control unit through a public line network, may be managed by the job management program, as a job.

The EEPROM 120 of the print server 100 may be an unrewritable ROM. Further, both a ROM and the EEPROM 120 may be provided. In this case, a correction to an initial value of the setting stored in the ROM 120 is stored in the EEPROM 120 and reflected, and the original initial value before the correction is made is stored in the ROM 120.

In the above description, a print command has been taken as an example of a job. However, it is not limited to the print command, a computer executable process may be set as a job and the execution order may be managed by the job management program of the above-described embodiment.

The order of storing the received print commands into the queue 132 is not limited to the order of receipt of the print commands as the above-described embodiment. For example, the print commands can be stored in priority order which is predetermined on the issuer of jobs or in order of the number of total pages.

The invention can be applied to the image forming apparatus, the copying machine, the multifunctional machine, and other equipment and devices that receive jobs from a plurality of terminal devices and execute the received jobs.

According to the above-described embodiment, the unit rate of each job varies depending on an estimated job execution charge calculated based on the amount of work that is required to execute all the print commands. However, by performing the comparison on the print commands in the storage order, the print command whose acceptable job execution charge is higher than or equal to the estimated job execution charge can be executed. Therefore, the print command whose acceptable job execution charge is set to be high can be performed prior to the print command which does not satisfy the comparison result.

The priority of the print command can be determined according to the issuers of the print commands.

The discount rate can be set according to the time periods at which the print command is executed, so that the processing can be prevented from being executed at the same time period and the load on the laser beam printer 1 can be distributed.

When the execution of the print command is deferred, a discount is given to the deferred print command. Therefore, the estimated job execution charge is reduced every time the execution of the print command is deterred, and the deferred print command can be preferentially performed.

When an acceptable job execution charge is set to be high so that an urgent print command is to be preferentially performed, a time limit to execute the print command can be provided. In addition, the high acceptable job execution charge is not applied to the print command if the print command cannot be executed within the time limit. Accordingly, the user's expense can be reduced.

When the estimated job execution charges of all the print commands stored in the queue 132 are higher than the acceptable job execution charges, the print command stored at the heat of the queue 132 in the storage order can be executed. Therefore, the unperformable print commands will not exist in the queue 132.

When the estimated job execution charges of all the print commands stored in the queue 132 are higher than the acceptable job execution charges, the print command, which has the highest acceptable job execution charge and stored at the position more closer to the head (i.e., top) of the queue 132, can be executed. Therefore, the unperformable print commands will not exist in the queue 132 and the print command issued by the user who can pay the highest charge can be preferentially executed.

When the estimated job execution charges of all the print command stored in the queue 132 are higher than the acceptable job execution charges, the print command, which has the acceptable job execution charge that is the nearest to the its estimated job execution charge and is stored at the position more closer to the head of the queue 132, can be executed. Therefore, the unperformable print commands will not exist in the queue 132 and the print command issued by the user who assigned an appropriate acceptable job execution charge can be preferentially executed.

The estimated job execution charge can be changed according to the amount of work to be performed by the laser beam printer 1 based on the unit rate, a minimum charge can be made on the print command when the load on the laser beam printer 1 is light.

The estimated job execution charge can be changed according to the amount of work to be performed by the laser beam printer 1, so that the print command whose acceptable job execution charge is set to be high can be preferentially executed when the load on the laser beam printer 1 is heavy.

Every time a new print command is issued, the estimated job execution charge for each print command is changed based on the unit rate calculated according to the amount of work required to execute all the print commands. However, when there is at least one print command whose acceptable job execution charge is higher than or equal to the estimated job execution charge, the new print command can be stored in the queue 132. Therefore, there is no detriment due to the change of the unit rate.

When the estimated job execution charges of all the print commands are higher than the respective acceptable job execution charges because of the change of the estimated job execution charges, the new print command can be erased before being stored in the queue 132. Accordingly, the print commands that have already been stored can be surely executed.

When the set acceptable job execution charge is below the basic charge which is the minimum charge, an error is informed to the issuer of the print command. Therefore, the condition where the print command cannot be performed for lack of money can be prevented from occurring.

The estimated job execution charge increases as the amount of work required to be performed by the laser beam printer 1 increases according to the increases of the amount of the print commands. The print commands assigned the high acceptable job execution charges can be preferentially executed, so that the user who has an urgent print command can be satisfied. Even when the estimated job execution charge is lowered because of the decrease of the amount of work, the print command can be executed at low cost, so that the user's expense can be reduced.

What is claimed is:

1. A job management device that determines an order in which a plurality of jobs are processed, comprising:
   a storage device that stores therein issued jobs in order; and
   a controller that:
      determines an amount of work required to process all the jobs stored in the storage device and calculates a processing execution rate for executing processing per unit, based on a determined amount of work;
      selects, in order, one of the jobs stored in the storage device;
      calculates a job execution rate of the job selected, based on the processing execution rate calculated and an execution requirement set to each job;
      compares the job execution rate calculated with an acceptable rate that is an upper limit set for the selected job in advance;
      selects, when the job execution rate of the job is higher than the acceptable rate of the job as a result of the comparison there between, a next job, calculates a job execution rate of the next job, and compares an acceptable rate of the next job with an obtained job execution rate; and
      performs, when the job execution rate of at least one job stored in the storage device is lower than or equal to an acceptable rate of the at least one job as a result of the comparison there between performed on each job stored in the storage device, control so that the at least one job whose job execution rate is lower than or equal to the acceptable rate of the job is executed.

2. The job management device according to claim 1, wherein the controller sets a discount rate, which is set to each issued job, based on a job issuer as the execution requirement.

3. The job management device according to claim 1, further comprising:
   a clock device that measures a current time, wherein the controller:
      obtains the current time being measured by the clock device when the job execution rate is calculated;
      stores discount rates, which vary depending on a time period at which the job execution rate is currently calculated, and time periods in correspondence to each other; and
      sets a discount rate corresponding to the current time obtained, as the execution requirement.

4. The job management device according to claim 1, wherein, when a late-stored job in the job storage device is executed prior to the jobs stored in the storage device previous to the late-stored job, the controller sets a discount rate on the job execution rate for a next or later job execution to each of the previously-stored jobs, as the execution requirement.

5. The job management device according to claim 1, further comprising:
   a clock device that measures a current time, wherein the controller:
      obtains the current time being measured by the clock device when the job execution is calculated;
      compares, based on a job execution time limit set to each of the issued jobs, the time limit with the current time obtained; and
      sets, at a time of comparing the acceptable rate with the job execution rate of a selected job, a compared acceptable rate as a first acceptable rate for a case where the selected job is executed within the time limit when the current time compared has not reached the time limit, and sets the compared acceptable rate as a second acceptable rate for a case where the selected job is performed after the time limit when the current time has passed the time limit.

6. The job management device according to claim 1, wherein as a result of the comparison between the acceptable rate and the job execution rate with respect to all the jobs stored in the storage device, when the job execution rates of all the jobs are higher than respective acceptable rates, the controller performs control so that the job stored at a head of the storage device is executed, and the controller sets the acceptable rate of the job at the head of the storage device as the job execution rate.

7. The job management device according to claim 1, wherein as a result of the comparison between the acceptable rate and the job execution rate with respect to all the jobs stored in the storage device, when the job execution rates of all the jobs are higher than the respective acceptable rates, the controller controls such that the job, which has a highest acceptable rate and is stored at a position closest to a head of the storage device, is executed and the controller sets the acceptable rate of the job as the execution rate.

8. The job management device according to claim 1, wherein as a result of the comparison between the acceptable rate and the job execution rate with respect to all the jobs stored in the job storage device, when the job execution rates of all the jobs are higher than their respective acceptable rates, the controller performs control so that the job, which has the acceptable rate that is the nearest to the execution rate of the job and is stored at a position closest to a head of the storage device, is executed and the controller sets the acceptable rate of the job as the job execution rate.

9. The job management device according to claim 1, wherein the controller calculates the processing execution rate, based on the amount of work required to process all the jobs stored in the storage device and a predetermined basic rate.

10. The job management device according to claim 1, wherein the controller calculates the processing execution rate, wherein the processing execution rate becomes higher as the amount of work required to process all the jobs stored in the job storage device increases.

11. A job management device that determines an order in which a plurality of jobs are processed, comprising:
a storage device that stores therein issued jobs in order; and
a controller that:
determines an amount of work required to process all the jobs, including the jobs stored in the storage device and a newly-issued job, every time a new job is issued, and calculates a processing rate for executing processing per unit, based on a determined amount of work;
selects, in order, one of the jobs stored in the job storage device every time the new job is issued;
calculates a job rate of the job selected based on the processing rate calculated;
compares the job rate calculated with an acceptable rate that is an upper limit set for the selected job in advance;
selects, when the job rate is higher than the acceptable rate of the job as a result of the comparison there between, a next job, calculates a job rate of the next job, and compares an acceptable rate of the next job with the obtained job rate; and
performs, when the job rate of at least one job stored in the job storage device is lower than or equal to an acceptable rate of the at least one job as a result of the comparison there between performed on each job stored in the storage device, control so that the storage device stores a new job therein.

12. The job control device according to claim 11, wherein the controller discards the new job when the job rates of all the jobs stored in the storage device are higher than respective acceptable rates as a result of the comparison.

13. The job control device according to claim 11, wherein the controller informs a terminal device, which has issued the new job, of an error when the acceptable rate of the new job is lower than a predetermined basic rate.

14. An image forming apparatus, comprising:
the job management device of claim 1, wherein the job is a print command; and
an image forming device that forms an image on a recording medium, based on the print command, in the print command processing order determined by the job management device.

15. An image forming apparatus, comprising:
the job management device of claim 11, wherein the job is a print command; and
an image forming device that forms an image on a recording medium, based on the print command, in the print command processing order determined by the job management device.

16. A method of determining an order in which a plurality of jobs are executed, comprising:
storing issued jobs in order;
determining with a determination device an amount of work required to process all the jobs and calculating a processing execution rate for executing processing per unit, based on the obtained amount of work;
selecting, in order, one of the jobs stored;
calculating a job execution rate of the job selected, based on the processing execution rate calculated and an execution requirement set to each job;
comparing the job execution rate calculated with an acceptable rate that is an upper limit for the selected job in advance;
performing control so that a next job is selected, a job execution rate of the next job is calculated and an acceptable rate of the next job with an obtained job execution rate is compared, when the job execution rate of a selected job is higher than the acceptable rate of a job as a result of the comparison there between; and
performing control, when the job execution rate of at least one job stored is lower than or equal to an acceptable rate of the at least one job as a result of the comparison there between performed on each job, so that the at least one job whose job execution rate is lower than or equal to the acceptable rate of the job, is executed.

17. The method of claim 16, further comprising the step of setting a discount rate, which is set to each issued job, based on a job issuer as the execution requirement.

18. The method of claim 16, further comprising:
measuring a current time;
obtaining the current time being measured when the job execution rate is calculated;
storing discount rates, which vary depending on a time period at which the job execution rate is calculated, and time periods in correspondence to each other; and
setting a discount rate corresponding to the current time obtained, as the execution requirement, based on the discount rates and the time periods that correspond to each other.

19. The method of claim 16, further comprising the step of setting, as the execution requirement, a discount rate on the job execution rate for a next or later job execution to each job stored previous to a late-stored job, when the late-stored job is executed prior to the previously-stored jobs.

20. The method of claim 16, further comprising:
measuring a current time;
obtaining the current time being measured when the job execution rate is calculated;
comparing, based on a job execution time limit set to each of the issued jobs, the time limit with the current time obtained; and
setting the compared acceptable rate as a first acceptable rate for a case where the selected job is executed within the time limit when the current time compared has not reached the time limit, and setting the compared acceptable rate as a second acceptable rate for a case where the selected job is performed after the time limit when the current time has passed the time limit, at the time of comparing the acceptable rate with the job execution rate of the selected job.

21. The method of claim 16, wherein as a result of the comparison between the acceptable rate and the job execution rate with respect to all the jobs stored, when the job execution rates of all the jobs are higher than their respective acceptable rates, control is performed so that the job stored at a head is executed, and the acceptable rate of the job stored at the head is set as the job execution rate.

22. The method of claim 16, wherein as a result of the comparison between the acceptable rate and the job execution rate with respect to all the jobs stored, when the job execution rates of all the jobs are higher than their respective acceptable rates, control is performed such that the job, which has a highest acceptable rate and is stored at a position closest to a head in the storage order, is executed and the acceptable rate of the job is set as the execution rate.

23. The method of claim 16, wherein as a result of the comparison between the acceptable rate and the job execution rate with respect to all the jobs stored, when the job execution rates of all the jobs are higher than their respective acceptable rates, control is performed so that the job, which has the acceptable rate that is the nearest to the job execution rate and is stored at a position closest to a head in the storage order, is executed and the acceptable rate of the job is set as the job execution rate.

24. The method of claim 16, wherein the processing execution rate is calculated, based on the amount of work required to process all the jobs stored and a predetermined basic rate.

25. The method of claim 16, wherein the processing execution rate is calculated and the processing execution rate becomes higher as the amount of work required to process all the jobs stored increases.

26. A method of determining an order in which a plurality of jobs are executed, comprising:
storing issued jobs in order;
determining with a determination device an amount of work required to process all the jobs, including the jobs stored and a newly-issued job, every time a new job is issued, and calculating a processing rate for executing processing per unit, based on the determined amount of work;
selecting, in order, one of the jobs stored every time the new job is issued;
calculating a job rate of the job selected based on the processing rate calculated;
comparing the job rate calculated with an acceptable rate that is an upper limit set for the selected job in advance;
performing control so that a next job is selected, a job rate of the next job is calculated and an acceptable rate of the next job is compared with the obtained job rate, when the job rate is higher than the acceptable rate of the job as a result of the comparison there between; and performing control so that a new job is stored therein, when the job rate of at least one job stored is lower than or equal to the acceptable rate of the job as a result of the comparison there between performed on each job stored.

27. The method of claim 26, further comprising the step of discarding the new job when the job rates of all the jobs stored are higher than their respective acceptable rates as a result of the comparison performed.

28. The method of claim 26, further comprising the step of informing a terminal device, which has issued the new job, of an error when the acceptable rate of the new job is lower than a predetermined basic rate.

29. A method of forming an image, comprising:
determining an order in which the plurality of jobs are executed as recited in claim 16, wherein the jobs are print commands; and
forming an image on a recording medium, based on the determined order.

30. A method of forming an image, comprising:
determining an order in which the plurality of jobs are executed as recited in claim 26, wherein the jobs are print commands; and
forming an image on a recording medium, based on the determined order.

* * * * *